US012766601B2

(12) United States Patent
Stabio et al.

(10) Patent No.: US 12,766,601 B2
(45) Date of Patent: Oct. 20, 2026

(54) MULTIPLE-AXIS MACHINING CENTER WITH A TOOL MAGAZINE

(71) Applicant: VIGEL S.P.A., Borgaro Torinese (IT)

(72) Inventors: Diego Stabio, Nole (IT); Daniele Francesia Villa, Mezzenile (IT)

(73) Assignee: VIGEL S.P.A., Borgaro Torinese (IT)

( * ) Notice: Subject to any disclaimer, the term of this patent is extended or adjusted under 35 U.S.C. 154(b) by 295 days.

(21) Appl. No.: 18/564,949

(22) PCT Filed: Oct. 12, 2021

(86) PCT No.: PCT/EP2021/078169

§ 371 (c)(1),
(2) Date: Nov. 28, 2023

(87) PCT Pub. No.: WO2022/258208

PCT Pub. Date: Dec. 15, 2022

(65) Prior Publication Data

US 2024/0261916 A1 Aug. 8, 2024

(30) Foreign Application Priority Data

Jun. 10, 2021 (IT) ........................ 102021000015131

(51) Int. Cl.
*B23C 1/12* (2006.01)
*B23B 3/06* (2006.01)
(Continued)

(52) U.S. Cl.
CPC .............. *B23B 3/065* (2013.01); *B23C 1/002* (2013.01); *B23C 1/12* (2013.01); *B23C 1/14* (2013.01);
(Continued)

(58) Field of Classification Search
CPC ....... B23Q 1/012; B23Q 39/00–39/048; B23Q 3/15539; B23C 1/002; B23C 1/04;
(Continued)

(56) References Cited

U.S. PATENT DOCUMENTS

2002/0131836 A1 9/2002 Ferrari et al.
2007/0234541 A1* 10/2007 Feinauer ............. B23Q 39/028 483/23

(Continued)

FOREIGN PATENT DOCUMENTS

CN 104227478 A 12/2014
CN 110653398 A 1/2020

(Continued)

OTHER PUBLICATIONS

Machine translation of DE 19948822 A1, which DE ’822 was published Apr. 19, 2001.*

(Continued)

*Primary Examiner* — Erica E Cadugan
(74) *Attorney, Agent, or Firm* — CANTOR COLBURN LLP

(57) ABSTRACT

A machining center includes two independent carriages that are supported so that they can slide along respective longitudinal translation axes by a pair of parallel horizontal rails which are extended along a longitudinal direction and are fixed in a raised position to a supporting structure. Each one of the carriages supports a machining head which can move along a transverse translation axis and along a vertical translation axis by guiding components. Each of the machining heads supports a tool holding spindle so that it can rotate about a horizontal rotation axis by rotary support components. A workpiece holding table is supported at a base of the supporting structure so that it can rotate about a first rotation axis which is extended in a horizontal and longitudinal (Continued)

direction. Two mechanized tool magazines at the opposite longitudinal ends of the supporting structure are accessible by the spindles.

10 Claims, 2 Drawing Sheets

(51) Int. Cl.

| | |
|---|---|
| ***B23B 39/16*** | (2006.01) |
| ***B23C 1/00*** | (2006.01) |
| ***B23C 1/14*** | (2006.01) |
| ***B23G 11/00*** | (2006.01) |
| ***B23Q 1/01*** | (2006.01) |
| ***B23Q 1/48*** | (2006.01) |
| ***B23Q 1/52*** | (2006.01) |
| ***B23Q 1/54*** | (2006.01) |
| ***B23Q 3/157*** | (2006.01) |
| ***B23Q 11/00*** | (2006.01) |
| ***B23Q 11/08*** | (2006.01) |
| ***B23Q 39/02*** | (2006.01) |
| *B23Q 1/62* | (2006.01) |
| *B23Q 3/155* | (2006.01) |
| *B23Q 39/00* | (2006.01) |

(52) U.S. Cl.

CPC ............ *B23Q 1/012* (2013.01); *B23Q 1/015* (2013.01); *B23Q 1/525* (2013.01); *B23Q 1/5406* (2013.01); *B23Q 11/0053* (2013.01); *B23Q 11/08* (2013.01); *B23Q 39/021* (2013.01); *B23Q 1/5431* (2013.01); *B23Q 1/626* (2013.01); *B23Q 3/15539* (2016.11); *B23Q 3/15706* (2013.01); *B23Q 3/15722* (2016.11); *B23Q 11/0067* (2013.01); *B23Q 2039/002* (2013.01); *B23Q 39/025* (2013.01); *B23Q 39/026* (2013.01); *B23Q 2220/004* (2013.01); *B23Q 2701/025* (2013.01); *Y10T 29/5109* (2015.01); *Y10T 409/304088* (2015.01); *Y10T 409/307168* (2015.01); *Y10T 409/308288* (2015.01); *Y10T 409/308512* (2015.01); *Y10T 483/115* (2015.01); *Y10T 483/1795* (2015.01); *Y10T 483/1845* (2015.01)

(58) Field of Classification Search

CPC ... B23C 1/08; B23C 1/10; Y10T 409/307728; Y10T 409/308288; Y10T 408/36–385; Y10T 409/307168; Y10T 409/307784; Y10T 409/308344; Y10T 409/308568; Y10T 483/175; Y10T 483/1845–1855; Y10T 409/308512; B23B 39/006; B23B 39/16–39/24; B24B 7/005; B24B 7/224; B24B 27/0023; B27C 3/04; B27C 9/04

USPC ....... 409/202, 212, 192, 203, 213, 217, 216; 408/31–53; 483/37, 63–64

See application file for complete search history.

(56) References Cited

U.S. PATENT DOCUMENTS

| | | | | |
|---|---|---|---|---|
| 2010/0189525 | A1* | 7/2010 | Tatsuda ................ | B23Q 1/5406 409/231 |
| 2016/0167182 | A1 | 6/2016 | Seo et al. | |
| 2024/0316706 | A1* | 9/2024 | Francesia Villa .... | B23Q 39/026 |

FOREIGN PATENT DOCUMENTS

| | | | |
|---|---|---|---|
| DE | 19800034 | A1 | 7/1999 |
| DE | 19948822 | A1 * | 4/2001 |
| DE | 102017122439 | A1 | 4/2018 |
| DE | 102006063037 | B3 | 4/2019 |
| EP | 1250976 | A1 | 10/2002 |
| JP | H08215961 | A | 8/1996 |
| JP | 2005262375 | A | 9/2005 |
| JP | 2011045947 | A | 3/2011 |
| JP | 2011528996 | A | 12/2011 |
| JP | 2013-248709 | A * | 12/2013 |
| JP | 2014133299 | A | 7/2014 |
| JP | 2018058205 | A | 4/2018 |
| JP | 2021024062 | A | 2/2021 |
| WO | 9741997 | A1 | 11/1997 |

OTHER PUBLICATIONS

Machine translation of JP 2013-248709 A, which JP ’709 was published Dec. 12, 2013.*

International Search Report for International Application No. PCT/EP2021/078169, dated Feb. 4, 2022, 3 pages.

Italian Search Report for Italian Application No. 202100015131, dated Jan. 27, 2022, 8 pages.

Written Opinion for International Application No. PCT/EP2021/078169, dated Feb. 4, 2022, 6 pages.

Chinese Office Action for Application No. 202111222265.2, dated Sep. 3, 2025, 14 pages with translation.

Japanese Office Action for Application No. 2023-576421, dated Apr. 24, 2025, 14 pages with translation.

Korean Office Action for Application No. 10-2023-7043480, dated Jan. 29, 2026, 7 pages with translation.

Chinese Office Action for Application No. 202111222265.2, dated Apr. 10, 2026, 12 pages with translation.

Chinese Office Action for Application No. 202111222265.2, dated Jun. 25, 2026, 10 pages with translation.

* cited by examiner

MULTIPLE-AXIS MACHINING CENTER WITH A TOOL MAGAZINE

CROSS-REFERENCE TO RELATED APPLICATIONS

This application is a 35 U.S.C. § 371 National Stage patent application of PCT/EP2021/078169, filed on 12 Oct. 2021, which claims the benefit of Italian patent application 102021000015131, filed on 10 Jun. 2021, the disclosures of which are incorporated herein by reference in their entirety.

TECHNICAL FIELD

The present disclosure relates to a multiple-axis machining center with a mechanized tool magazine.

BACKGROUND

As is known, a multiple-axis machining center can comprise generally a motorized tool holding spindle mounted on a machining head which can move along two or more axes, with respect to the workpiece, so as to subject the workpiece to successive different machining processes such as milling, boring, tapping, and the like.

The axis of the spindle may be arranged horizontally or vertically.

It is also known to provide machining centers of the above cited type with a mechanized tool magazine, from which the spindle automatically picks up the tools to be used in the various machining steps, utilizing the mobility in space of the machining head.

A tool magazine of a known type, particularly appreciated for its reliability, comprises a motorized tool holding drum. In the case of a spindle with a horizontal axis, the tool holding drum can be arranged in front of the spindle so that its is axis horizontal and at right angles to the axis of the spindle, so as to present to the latter the tools to be picked up.

In order to increase productivity, the machining center can also be provided with multiple parallel spindles mounted on a single machining head, so as to machine multiple workpieces simultaneously.

Machining centers of the above cited type, while highly appreciated for their machining precision and their productivity—since they can perform numerous machining processes on the workpiece with a single positioning operation—however have the limitation of being suitable especially for machining medium-small workpieces, e.g., small mechanical parts in the automotive sector or in the industrial sector.

Larger workpieces, such as portions of the chassis or body of a vehicle, currently can be subjected to successive machining processes on different machine tools, with a consequent drastic reduction in productivity and in machining precision, since the workpiece must be repositioned each time it is transferred from one machine tool to the next.

So-called multitasking machines are known which are capable of performing different machining processes on large workpieces, but they too are limited in terms of productivity, since they have a single spindle which can move with respect to multiple axes, e.g., five axes.

Furthermore, known multitasking machines, despite using a single spindle, are extremely bulky and therefore difficult to place within the production facility.

SUMMARY

Therefore, the aim of the present disclosure is to provide a multiple-axis machining center with mechanized tool magazine that is capable of machining large workpieces, such as portions of the chassis or body of vehicles, while having substantially the same machining versatility and the same dimensions as machining centers designed to machine medium-small workpieces.

Within this aim, the disclosure provides a multiple-axis machining center that has a much higher productivity than currently known multitasking machines for machining large workpieces.

This aim and these advantages that will become better apparent from the description that follows, are achieved by providing a machining center as set forth in the independent claim, while the dependent claims define other advantageous characteristics of the disclosure.

BRIEF DESCRIPTION OF THE DRAWINGS

The disclosure is now described in greater detail with reference to some preferred but not exclusive embodiments thereof, illustrated by way of non-limiting example in the accompanying drawings, wherein.

DETAILED DESCRIPTION OF THE DRAWINGS

With reference to the figures, a machining center 10 according to the disclosure comprises a supporting structure 12, which in the illustrated schematic embodiment has a box-like profile, in which a work area MA is defined.

Two independent carriages 14', 14" are supported so that they can slide by a pair of parallel horizontal rails 16*a*, 16*b*, which are fixed in a raised position, preferably at the upper end, of the supporting structure 12 and are extended in a longitudinal direction.

Each of the two carriages 14', 14" can therefore slide along a respective longitudinal translation axis X', X".

Each of the two carriages 14', 14" supports a respective slider 18', 18" which can slide along a respective horizontal guide 20', 20" which is integral with the carriage 14', 14" and is extended along a respective transverse translation axis Y', Y".

Each of the sliders 18', 18" supports a respective machining head 22', 22", which in turn is supported slidingly on a respective vertical guide 24', 24" that is integral with the slider 18', 18" and is extended along a respective vertical translation axis Z', Z".

Figure 1:
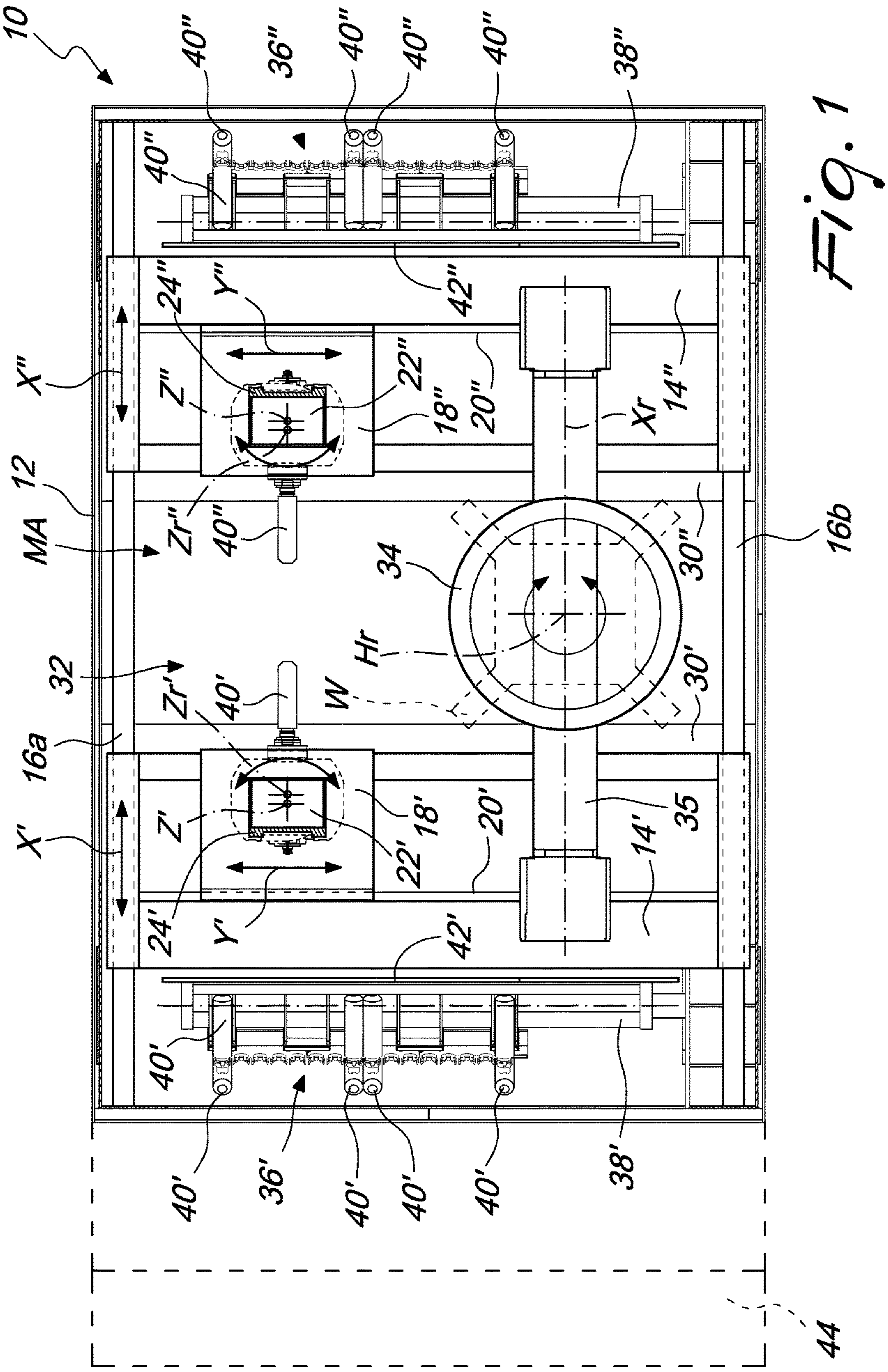
FIG. 1 is a schematic plan view of a machining center according to the present disclosure.
Figure 2:
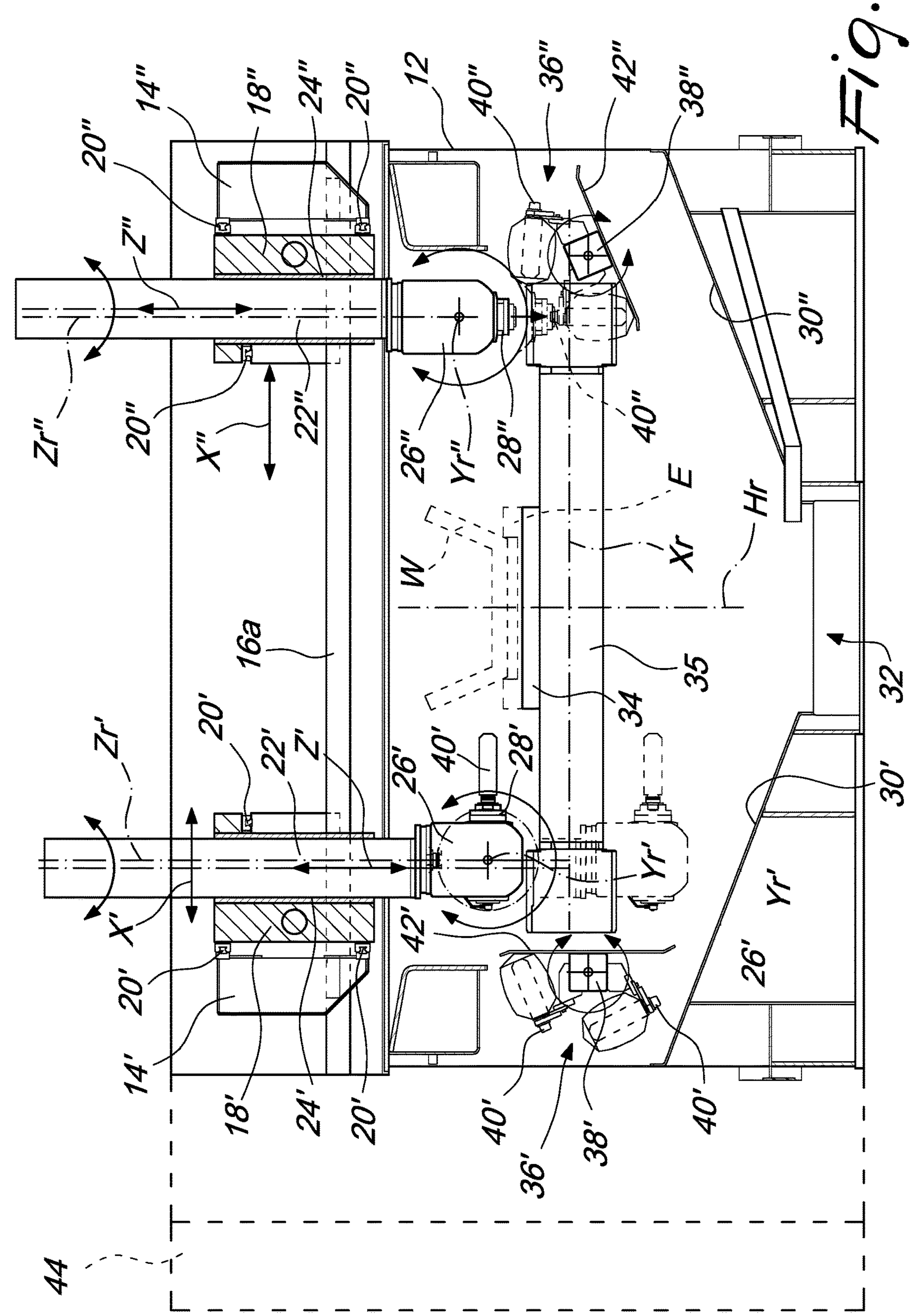
FIG. 2 is a schematic lateral elevation view of the machining center of FIG. 1.

In particular, the machining head 22', 22" is provided, at its lower end, with a fork-like support 26', 26" (FIG. 2), by means of which it supports a tool holding spindle 28', 28" so that it can rotate about a horizontal rotation axis Yr', Yr". Preferably, the fork-like support 26', 26" can rotate about a vertical rotation axis Zr', Zr" which is parallel to, or coincides with, the respective vertical translation axis Z', Z".

The spindle 28', 28" can mount different types of tools for machining processes such as milling, boring, tapping, and the like.

According to a preferred embodiment of the disclosure, the supporting structure 12 has a base which comprises at least one chute which leads into a chip discharge area, advantageously two chutes 30', 30" which are longitudinally mutually opposite and lead into a central chip discharge area 32.

The base 30', 30" supports a rotating workpiece holding drum 35 the rotation axis Xr of which is extended in a horizontal and longitudinal direction. A workpiece holding table 34 is supported on the workpiece holding drum 35, preferably so that it can rotate about a rotation axis Hr of its own which is perpendicular to the rotation axis of the workpiece holding drum 35.

In this embodiment, the workpiece holding table 34 is advantageously arranged in a position that is centered longitudinally and offset transversely (i.e., the axis of the workpiece holding drum 35 is laterally offset with respect to the centerline of the machining center), for the purposes that will be clarified in greater detail hereinafter.

In a per se known manner, the workpiece W to be machined (shown schematically in dashed lines) can be fixed to the workpiece holding table 34 means of a workpiece holding fixture E (shown schematically in dashed lines).

The machining center 10 is provided with two mechanized tool magazines 36', 36", which are arranged at the opposite longitudinal ends of the supporting structure 12 so that they can be accessed by the two spindles 28', 28", respectively.

In this embodiment, each of the two tool magazines 36', 36" comprises a rotating tool holding drum 38', 38" which supports peripherally a plurality of tools 40', 40". The rotating tool holding drums 38', 38" are arranged so that their axes are horizontal and parallel to the transverse translation axes Y', Y". In each of the tool magazines 36', 36", the tools 40', 40" are arranged on one, two (as in the illustrated example) or even multiple angularly spaced rows of the respective tool holding drum 38', 38", said rows being extended 10 parallel to the axis of the respective tool holding drum 38', 38".

The spindles 28', 28" automatically pick up the tools 40', 40" to be used in the various machining steps from the respective mechanized tool magazines 36', 36", utilizing the mobility in space of the respective machining heads 22', 22". Depending on where the tool is located on the tool holding drum 38', 38", the drum is rotated so as to present the tools of one row or the other to the respective spindle 28', 28".

Advantageously, each of the tool magazines 36', 36" is provided with a shield 42', 42" which, in this embodiment, is fixed to the respective tool holding drum 38', 38". During machining, the tool holding drum 38', 38" is rotated so as to direct the respective shield 42', 42" toward the work area MA, so as to hide the respective tool magazine 36', 36" and protect it from the machining chips.

In an alternative embodiment, the shields might be movable independently of the respective drums.

Of course, all the above described movable components of the machining center are motorized by means of actuation systems of the conventional type, e.g., electric actuators, hydraulic actuators and/or pneumatic actuators, which are subjected to a control unit (not shown) in a manner which is per se conventional in the field.

An electric/fluidic control unit 44 (shown schematically in dashed lines in the figures) is arranged selectively at one of the two longitudinal ends of the supporting structure 12.

Of course, the supporting structure 12 can be provided with doors and windows for inspection (not shown) on one or more sides, in a manner which is per se conventional in the field.

In operation, the workpiece W to be machined is fixed on the rotating table 34 by means of the fixture E.

The workpiece W can be machined simultaneously by both spindles 28', 28", so as to increase productivity and, in some cases, even double it with respect to known solutions.

For example, the spindles 28', 28" can perform a same operation on two opposite sides of the workpiece W or, being completely independent, different operations by taking tools of a different type from the respective tool magazines 36', 36".

During machining, the shields 42', 42" protect the tool magazines 36', 36" from the machining chip, which therefore falls into the chip collection area 32 via the chutes 30', 30".

The spindles 28', 28" can move along the three Cartesian axes and can furthermore rotate about the respective transverse rotation axes Yr', Yr" and vertical rotation axes Zr', Zr". Additional degrees of freedom are provided by the rotation of the workpiece holding table 34 about its own axis and about the axis of the workpiece holding drum 35, so that any large workpiece, with a single positioning operation, can be machined substantially in any direction and on any side is directed toward the work area MA.

In an alternative embodiment, the fork-like supports 26', 26" might be nonrotatable about the vertical rotation axes Zr', Zr".

The workpiece holding table 34 also might be mounted so as to be fixed on the workpiece holding drum 35 instead of being rotatable about the axis Hr.

As the person skilled in the art will appreciate, one advantage of the disclosure is that the two carriages 14', 14" share the same tracks **16*a*, 16*b* for translation in a longitudinal direction. In this manner, each of the two spindles 28', 28"** can "trespass", in a longitudinal direction, onto the half of the work area that is occupied by the other spindle, thus offering high versatility.

In this preferred embodiment, the transversely offset position of the rotating table allows the spindles 28', 28" to machine workpieces that are even larger (as much as substantially twice the dimensions) with respect to the useful stroke of the horizontal guides 20', 20" (transverse axes Y', Y").

Some preferred embodiments of the disclosure have been described, but the person skilled in the art may of course apply various modifications and variations within the scope of the claims.

For example, the workpiece holding drum 35 might support two workpiece holding tables so that the two spindles 28', 28" can machine simultaneously two smaller workpieces, each mounted on a respective workpiece holding table. Although the machining center described and illustrated herein has been conceived to machine large workpieces, such as parts of the chassis or body in the automotive, aeronautical, nautical and similar sectors, it has in fact been observed in practice that the same principles can be applied to machining centers for machining medium-small workpieces, achieving several advantages.

Furthermore, the transversely offset position of the workpiece holding table is to be understood as an advantageous but not necessary characteristic of the disclosure.

The guiding means that allow the translation or rotation of the various movable elements of the machining center may be provided by means of technologies that are commonly used in the field, which are well known to the person skilled in the art, such as rotating supports or sliding supports which use rolling bearings, low-friction sliders, and the like.

The fork-like supports 26', 26" that rotatably support the spindles 28', 28" may of course be replaced with differently shaped rotary support means, e.g., rotating supports provided with a single arm instead of two parallel arms as in the case of the forks.

Although tool magazines of the type described above are particularly appreciated for their reliability, one or both of the tool magazines may of course be of a different type, e.g., chain-type tool magazines.

Finally, the functional order of the translation/rotation axes may of course be varied or reversed with respect to what has been described and illustrated.

The invention claimed is:

1. A machining center comprising:

two independent carriages, both supported, so as to slide along respective longitudinal translation axes, by a pair of parallel horizontal rails which are extended along a longitudinal direction and are fixed to a supporting structure, said machining center comprising a horizontal longitudinal centerline arranged between said pair of horizontal rails, each one of said independent carriages supporting a respective machining head, each of the machining heads being configured, by means of a respective guiding means, to move along a respective transverse translation axis which is transverse with respect to said horizontal longitudinal centerline and along a respective vertical translation axis, each machining head supporting a respective tool holding spindle, each of the tool holding spindles being configured, by means of a respective rotary support means, to rotate about a respective horizontal rotation axis, said machining center further comprising a workpiece holding table which is supported at a base of said supporting structure so that said workpiece holding table is configured to rotate about a first rotation axis which is extended in a horizontal and longitudinal direction, and the machining center further comprising two tool magazines, wherein each of the tool magazines is supported at a respective one of two opposite longitudinal ends of said supporting structure, wherein each of the tool magazines is accessible by a respective one of said tool holding spindles, said workpiece holding table being arranged in a position that is longitudinally centered on the base with respect to said horizontal longitudinal centerline of the machining center, and that is transversely offset on the base with respect to said horizontal longitudinal centerline of the machining center.

2. The machining center according to claim 1, wherein each said guiding means comprise, for each one of said carriages, a respective slider configured to slide along a respective horizontal guide which is integral with the one of said carriages and which is extended in a transverse direction with respect to said longitudinal centerline, and, for each respective said slider, a respective vertical guide which is integral with the respective said slider and which is engaged slidingly by a respective one of the machining heads.

3. The machining center according to claim 1, wherein each one of said respective rotary support means comprise a respective fork support.

4. The machining center according to claim 1, wherein said base comprises at least one chute which leads into a central chip discharge area.

5. The machining center according to claim 1, wherein said base of said supporting structure comprises two chutes which are disposed at opposite longitudinal ends of the base and lead into a central chip discharge area.

6. The machining center according to claim 1, wherein at least one of said tool magazines comprises a rotating tool holding drum which is arranged so that a rotation axis of the drum is extended horizontal and transverse with respect to said longitudinal centerline and so that the drum supports peripherally a plurality of tools.

7. The machining center according to claim 1, wherein each one of said tool magazines is provided with a respective shield adapted to shelter, during machining, the respective one of said tool magazines from machining chips.

8. The machining center according to claim 7, wherein each of said tool magazines comprises a respective rotating tool holding drum, and wherein each said shield is fixed to a respective one of the rotating tool holding drums.

9. The machining center according to claim 1, wherein each one of said respective rotary support means is configured to rotate about a vertical rotation axis which is parallel to, or coincides with, the respective vertical translation axis.

10. The machining center according to claim 1, wherein said workpiece holding table is supported so that said workpiece holding table is also configured to rotate about a second rotation axis which is perpendicular to the first rotation axis.

* * * * *